(No Model.)

A. W. STEVENS.
THRASHING MACHINE.

No. 247,962. Patented Oct. 4, 1881.

Witnesses:
W. B. Masson
W. E. Bowen

Inventor:
Abram W. Stevens,
by E. E. Masson
atty.

UNITED STATES PATENT OFFICE.

ABRAM W. STEVENS, OF AUBURN, NEW YORK.

THRASHING-MACHINE.

SPECIFICATION forming part of Letters Patent No. 247,962, dated October 4, 1881.

Application filed March 25, 1881. (No model.)

*To all whom it may concern:*

Be it known that I, ABRAM W. STEVENS, a citizen of the United States, residing at Auburn, in the county of Cayuga and State of New York, have invented certain new and useful Improvements in Thrashing-Machines, of which the following is a specification.

My invention relates to improvements in the construction and arrangement of the concave part of the thrasher for the purpose of making a portion thereof adjustable for various kinds of grain, as required, and thus vary the strain on the spikes of both the cylinder and concave.

Heretofore the concave of thrashing-machines has been provided with transverse rods carrying spikes or teeth, and these rods have been pivoted so as to present the spikes at any desired angle to the spikes of the main cylinder. Flat plates have also been placed between the spiked rods, either horizontally or tangent to the path of the main cylinder.

The objects of my improvements are to produce a continuous concave of spiked rods alternating with slats arranged in pairs radially to main cylinder, said slats being serrated or indented to receive the spikes of the rod folded even with the top thereof, when desired.

The invention will first be described in connection with the drawings, and then pointed out in the claims.

Figure 1:
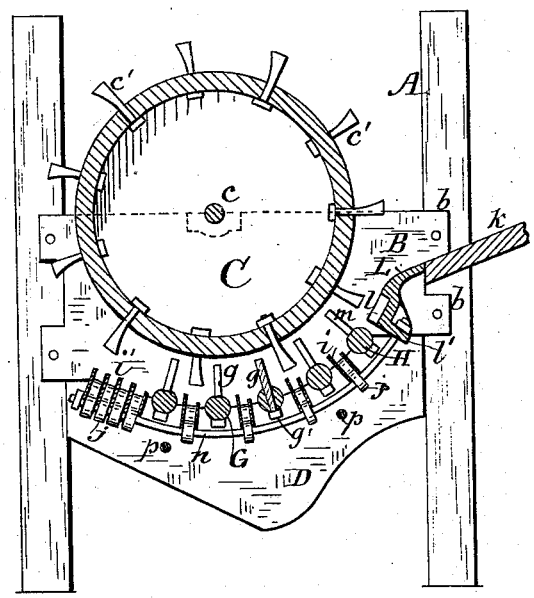
Figure 3:
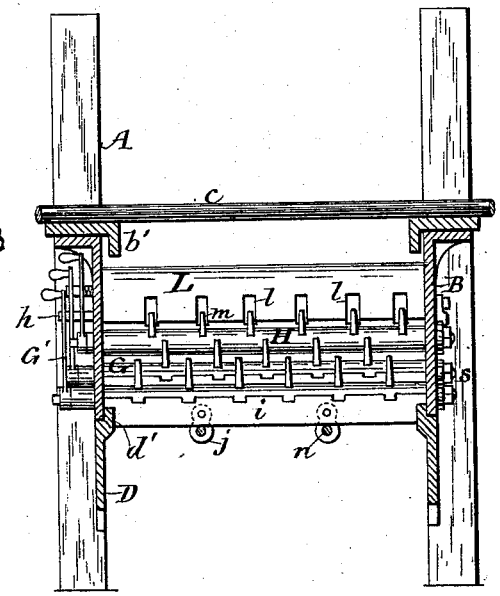
Figure 2:
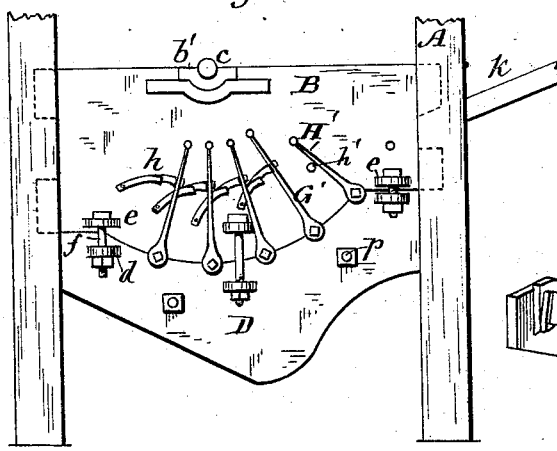
Figure 4:
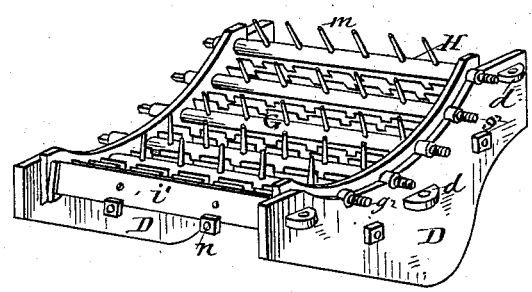
Figure 5:
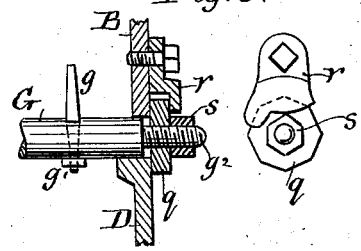

In said drawings, Figure 1 represents a vertical section through the thrashing-cylinder and concave. Fig. 2 is a side view of the frame containing the concave. Fig. 3 is a transverse section through the concave. Fig. 4 is a perspective view of the concave, and Fig. 5 views of details.

In said drawings, A represents a portion of the framing of the machine, to which the side plates, B, are secured by bolts passing through the ears *b* thereof. Upon the top of the side plates are placed bearings *b'* to receive the shaft *c* of the thrashing-cylinder C, the latter being provided with the ordinary spikes or teeth, *c'*.

The concave placed under the main cylinder C is composed of two plates, D, provided on the outer side with lugs *d*, corresponding with the lugs *e* projecting from the side plates, B, to receive bolts *f* to unite the plates B and D together, the upper edge of each side plate, D, being flanged or ribbed in at *d'* to engage against the bottom edge of plate B and add to the strength of the parts.

The concave is formed of a series of bars, G, provided with removable spikes or teeth *g*. These bars are preferably cylindrical, with two opposite sides of the cylinder flattened to present a good bearing on one side for the spike-retaining nuts *g'*, and also to give stability to the bar while the row of holes to receive the spikes is being drilled. Openings are formed in the side plates, D, of the concave, to receive the ends of the bars G and allow them to be partly revolved. To retain these bars with the spikes thereon standing or inclined in any desired position, one end (or more) of each bar is provided with a handle, G', which is kept in place by a spring-catch, *h*, secured to the outside of the plates B.

Between the spiked bars G are placed a series of slats, *i*, (preferably a pair of them,) with thimbles *j* between them. To retain the slats *i* so that they will stand substantially on a radial line of the main cylinder, the ribbed edge *d'* of the side plates, D, is grooved or provided with ribs to form between them radiating recesses for the reception of said slats. Toward the rear end of the concave a series of slats, *i'*, are placed, with thimbles between them to complete it and prevent the passage of wheat-heads, &c.

The grain is delivered upon the feed-board K and passes over the transverse plate L. This plate L is secured to the side plates, B, and is provided with recesses or pockets *l* for the reception of the first row of teeth or band-cutters *m*, secured to the bar H, when it is not desired to use said band-cutters. This bar is also provided with handles H', that rest against pins *h'*, projecting from the outside of plates B, to retain the band-cutters in the path of the spikes on the main cylinder, as generally required. The front plate, L, has the lower edge thereof provided with lugs *l'* to receive one end of the bolts *n*, that pass through the thimbles *j* and under the lower edge of the slats *i*. The opposite end of the bolts, after passing through the slats *i'*, is retained by a nut bearing against the last of said slats, the series of slats *i'*, with their thimbles, forming a compound beam having the necessary strength. Of the slats $i$, arranged in pairs between the journaled spiked bars G, the rear slat is made wider than the first, to form steps for arresting and directing the thrashed grain through the bottom of the concave. Each slat $i$ has also its upper edge serrated (thereby facilitating the thrashing) or formed with recesses to receive the spikes $g$ when they are turned down upon them, to render the floor of the concave nearly free for the passage of such grain or plants as buckwheat, pease, beans, &c.

The spring-catches $h$ are in the form of an arc of a circle, and provided with a series of teeth projecting therefrom to receive and retain the handles G' of the spiked bars of the concave. To keep together the parts forming the concave, so that it can be shipped apart from the thrasher, one or two bolts, $p$, are used to unite the side plates, D, thereof.

The division-line between the side plates, B and D, passes preferably through the axis of the bars G, to allow each part of the concave to be removed or replaced without interfering with the other parts of the thrasher.

To adjust the bars G laterally, so that the spikes thereon will be between the tracks of the spikes on the main cylinder, one end of said bars is screw-threaded at $g^2$ to receive two nuts. The inner nut, $q$, is made with a wide flange, and is used as a collar for each bar, and is retained by a catch, $r$, secured to the side plate, B, a jam-nut, $s$, being placed in addition upon the end $g^2$ to secure it, while allowing the bars to rotate. This adjustment is clearly shown in Fig. 5.

Having now fully described my invention, I claim—

1. The combination of the cylinder C, side plates, D, a series of slats arranged in pairs, and bars provided with removable teeth and pivoted between each pair of slats, substantially as and for the purpose described.

2. The combination of the cylinder C, side plates, D, a series of slats, arranged in pairs and radially to said cylinder, and bars provided with teeth and pivoted between each pair of slats, substantially as and for the purpose described.

3. The combination of the side plates, D, a series of slats, arranged in pairs and provided with indentations in their upper edge, with bars provided with teeth and pivoted between each pair of slats, said teeth being adapted to rest within the indentations of said slats, substantially as and for the purpose set forth.

4. The combination of cylinder C, side plates, B, and spring-catches $h$ thereon, side plates, D, and series of slats secured to said plates radially to the cylinder, with bars G and handles G', substantially as and for the purpose described.

5. The combination of side plates, D, a series of bars, G, pivoted thereto, slats $i$ between the bars, and thimbles between each pair of slats, substantially as and for the purpose described.

6. The combination of side plates, B, and transverse plate L, provided with pockets $l$, with side plates, D, and pivoted cutter-bar provided with cutters adapted to rest in said pockets, substantially as and for the purpose described.

7. The combination of side plates, B, transverse plate L, provided with pockets for the reception of band-cutter teeth, a series of slats arranged in pairs, and thimbles between them, with rods $n$ passing through the thimbles, substantially as and for the purpose described.

8. The combination of side plates, B, having their lower edges convex and indented to form the upper journal-bearing of bars provided with teeth, with side plates, D, having their upper edges concave, and bolts $f$, passing through lugs projecting from the surface of said plates, substantially as and for the purpose set forth.

9. The combination of the side plates, B, and catches $r$ with adjustable spike-bars G and nuts $q$, placed thereon and retained by said catches, substantially as and for the purpose described.

ABRAM W. STEVENS.

Witnesses:
GEORGE F. HAGUE,
C. E. STEVENS.